United States Patent
Shaffer et al.

(10) Patent No.: US 10,716,264 B2
(45) Date of Patent: Jul. 21, 2020

(54) BIODEGRADABLE HORTICULTURE CONTAINER

(71) Applicant: Selfeco LLC, Stillwater, MN (US)

(72) Inventors: Chadwick Aaron Shaffer, Oakdale, MN (US); Daniel George Mishek, Roseville, MN (US)

(73) Assignee: SELFECO LLC, Stillwater, MN (US)

( * ) Notice: Subject to any disclaimer, the term of this patent is extended or adjusted under 35 U.S.C. 154(b) by 384 days.

(21) Appl. No.: 14/577,112

(22) Filed: Dec. 19, 2014

(65) Prior Publication Data

US 2016/0174469 A1     Jun. 23, 2016

(51) Int. Cl.
    *A01G 9/02*     (2018.01)
    *A01G 9/029*    (2018.01)

(52) U.S. Cl.
    CPC .......... *A01G 9/0291* (2018.02); *A01G 9/0295* (2018.02)

(58) Field of Classification Search
    CPC .......... A01G 9/102; A01G 9/1026; A01G 2009/003; A01G 9/10; A01G 9/02
    USPC ...................................................... D11/155
    See application file for complete search history.

(56) References Cited

U.S. PATENT DOCUMENTS

| | | |
|---|---|---|
| D54,749 S | 3/1920 | Huntley |
| 1,880,136 A * | 9/1932 | Hickok ................ A01G 9/0293 47/77 |
| 2,016,434 A | 10/1935 | Huntley |
| 2,102,510 A | 12/1937 | Cecil |
| 2,459,073 A | 1/1949 | Hamilton |
| D192,811 S | 5/1962 | Guarriello |
| 3,184,890 A | 5/1965 | McKey |
| 4,008,544 A * | 2/1977 | Rupprecht ............. A01G 9/102 220/DIG. 30 |

(Continued)

FOREIGN PATENT DOCUMENTS

| | | |
|---|---|---|
| EP | 0 716 804 A1 | 6/1996 |
| EP | 2382861 A1 | 11/2011 |

(Continued)

OTHER PUBLICATIONS

Translation of FR2818522 (Year: 2003).*

(Continued)

*Primary Examiner* — Thanh Pham
(74) *Attorney, Agent, or Firm* — Kagan Binder, PLLC

(57) ABSTRACT

The containment of plants and seedlings as such plants or seedlings are grown, transported, displayed and planted is provided. Containers are comprised of biodegradable materials that have the advantage of being formed into containers with various features, such as by an injection molding process, but that can be buried within the soil along with a plant's roots. Such containers allow for plant or seedling transplanting without having to separate the container from the plant's root system. More preferably, biodegradable plastics utilized in accordance with the present invention have properties such that the plastic can be injection molded and yet provide a stable structural container that will last in accordance with predetermined set needs, which needs may include environmental aspects, timing aspects and decompositional aspects. By utilizing injection molding, containers can be formed with many advantageous features.

21 Claims, 15 Drawing Sheets

(56) References Cited

U.S. PATENT DOCUMENTS

| | | | |
|---|---|---|---|
| 4,336,669 A * | 6/1982 | Gordon | A01G 9/102 111/920 |
| 4,347,686 A * | 9/1982 | Wood | A01G 9/102 206/423 |
| 4,389,814 A | 6/1983 | Andreason et al. | |
| 4,697,382 A * | 10/1987 | Koeniger | A01G 9/0291 47/73 |
| D317,567 S | 6/1991 | Lane, Sr. | |
| 5,031,356 A * | 7/1991 | Thomsen | A01G 9/122 47/47 |
| D320,744 S | 10/1991 | Palisin, Jr. | |
| D321,652 S | 11/1991 | Palisin, Jr. | |
| D322,032 S | 12/1991 | Palisin, Jr. | |
| D322,033 S | 12/1991 | Palisin, Jr. et al. | |
| D333,196 S | 2/1993 | Dziersk et al. | |
| 5,471,788 A * | 12/1995 | Willes | A01G 23/02 47/73 |
| 5,523,293 A | 6/1996 | Jane et al. | |
| D382,230 S | 8/1997 | Weder et al. | |
| 5,798,436 A | 8/1998 | Gruber et al. | |
| D401,530 S | 11/1998 | Keskilohko | |
| 6,266,921 B1 | 7/2001 | Keskilohko | |
| D473,463 S | 4/2003 | Armstrong et al. | |
| 6,550,182 B2 * | 4/2003 | Locke | A01G 1/00 47/48.5 |
| D514,390 S | 2/2006 | Palder | |
| D605,375 S | 12/2009 | Anderson et al. | |
| 7,784,217 B2 | 8/2010 | San Solo et al. | |
| D625,067 S | 10/2010 | Shannon | |
| D630,547 S | 1/2011 | Aoyama | |
| D631,391 S | 1/2011 | Aoyama | |
| D640,034 S | 6/2011 | Martheenal | |
| 8,110,017 B2 | 2/2012 | Wells | |
| 8,205,492 B2 | 6/2012 | Martheenal | |
| D726,071 S | 4/2015 | Aoyama | |
| 2002/0180305 A1 | 8/2002 | Bautner | |
| 2005/0166454 A1 | 8/2005 | Banhagel | |
| 2008/0168710 A1 | 7/2008 | MacKenzie | |
| 2009/0107041 A1 * | 4/2009 | Hughes | A01G 9/0291 47/66.7 |
| 2009/0173002 A1 | 7/2009 | Plihal | |
| 2009/0272033 A1 | 11/2009 | Paleari | |
| 2010/0212223 A1 * | 8/2010 | Gibbons | A01G 17/04 47/44 |
| 2011/0167723 A1 | 7/2011 | Whitehead | |
| 2012/0137579 A1 * | 6/2012 | Gardenour | A01G 9/0291 47/65.8 |
| 2012/0181247 A1 * | 7/2012 | Grulke | A01G 9/102 215/386 |
| 2012/0311928 A1 * | 12/2012 | Ko | A01G 9/102 47/65.7 |
| 2013/0053293 A1 * | 2/2013 | Dituro | B65D 65/466 510/277 |
| 2014/0215909 A1 | 8/2014 | Hoff | |
| 2015/0013609 A1 | 1/2015 | Weder | |
| 2016/0150741 A1 | 6/2016 | Au | |
| 2016/0174469 A1 | 6/2016 | Shaffer et al. | |
| 2016/0270305 A1 | 9/2016 | Shaffer et al. | |

FOREIGN PATENT DOCUMENTS

| | | | |
|---|---|---|---|
| EP | 2570023 A1 | | 3/2013 |
| GB | 2495226 A | | 4/2013 |
| NL | 0274769 | * | 7/1988 |
| WO | 2013181343 A2 | | 12/2013 |
| WO | 2014006256 A1 | | 1/2014 |

OTHER PUBLICATIONS

U.S. Appl. No. 14/974,765, filed Dec. 18, 2015, titled "Biodegradable Horticulture Container".
U.S. Appl. No. 29/587,290, filed Dec. 12, 2016, titled "Horticulture Container".
U.S. Appl. No. 29/587,291, filed Dec. 12, 2016, titled "Horticulture Container".

* cited by examiner

BIODEGRADABLE HORTICULTURE CONTAINER

FIELD OF THE INVENTION

The present invention is directed to pots or containers suitable for the containment of the roots of plant seedlings or the like and by which such plants can be transported, displayed, and sold to consumers for replanting in the ground by the consumer. More particularly, the present invention is directed to plant containers that also can be buried in the ground and that facilitate plant root growth.

BACKGROUND

Horticulture pots have long been provided for transport and the start of growth for plants of any number of varieties. Typically, small or seedling plants are started from seed within such pots so that the plants can be transported, displayed and sold to consumers. Plastic pots are common from which a gardener will remove the plant, its root ball and a quantity of potting soil comprising germination mix from the container just prior to transplanting within a prepared soil hole or depression. The removal or separation process can cause damage to the plants root system. Such plastic planting pots are often ganged together for easy transport of multiple plants. These plastic pots provide basic containment of the plant's root and potting soil and are not meant to be buried in the ground or to provide further purpose. Plastic pots can be easily formed in a variety of shapes and sizes and can be formed with integral features such as drainage openings, handling features, and connective portions for connecting ganged multiple pots.

Degradable pots have also been known for a long time, such as comprising a biological material like compressed peat moss. By known techniques, such pots can be formed from the compressed peat moss into the shape of a container. The frailness of the material itself does not, however, lend these pots to having many features that can be integrated with plastic pots. The pots can advantageously be deposited in the soil along with the plant roots so that no step of removing the plant roots from the container is needed. These peat pots biodegrade rather quickly and also have a nutritive effect. The decomposing biological material adds plant nutrients into the soil surrounding the plant roots during at least early grown after replanting of the plants.

More recently, other materials have been developed for seed planting and the transport and use of plant seedlings that are also capable of being buried into the ground with plant roots.

United States Patent Application Publication No. 2009/0272033 describes biodegradable germinating pods for seedlings. The body of the tubular pods consists of 20 to 70% cellulose, 5 to 20% calcium carbonate, 30 to 70% calcium sulfate, and micronutrients.

European Patent No. 0 716 804 discloses soil decomposing seedling pots wherein coconut shell powder is mixed into a biodegradable plastic made of carboxylic acid-based compounds such as an aliphatic acid or lactic acid. The pot is made by injection molding.

SUMMARY OF THE INVENTION

The use of biodegradable containers for transplanting plants and seedlings provides significant benefits because the plants do not need to be separated from the containers prior to planting. This avoids damage to the root system of the plant. Since the containers break down in the soil, they permit the gardener to allow the container to remain in the soil. This simplifies the planting process, and eliminates the need to remove the container and deliver it to a recycling or disposal facility. In an embodiment, the container is compostable as discussed below. This embodiment is particularly advantageous, because it allows the plant to grow completely unhindered by structure left behind if the container was a non-compostable but open structure.

Because the container provides structural protection for a determinable period to the roots and soil provided in the container relative to the rest of the soil, plants provided in the container have the benefit of aeration and retention of the original germination mix for a longer period of time as compared to plants that are removed from conventional containers and planted directly into the soil. By controlling formation parameters of pots of the present invention, the period of structural protection can be controlled. The thickness of the material overall or material thickness selectively at any number of specific zones can predictably control the degradation timing, and thus of the structural protection.

The present horticulture containers additionally provide benefit in providing plant-beneficial nutrients to the soil as the container biodegrades. In the embodiment wherein the horticulture container is compostable, this nutritional benefit is delivered more quickly, preferably within critical times of growth of the plant being transplanted.

In one aspect, the present invention provides a horticulture container that can be buried in soil along with a transplanted plant and that will decompose and provide plant nutrients into the soil as the container decomposes, wherein the container comprises a wall defining an enclosure that is open at a first end and closed at a second end by a bottom portion, the enclosure defining a containment volume within which soil and plant roots can be contained, wherein the enclosure is tapered so as to decrease the containment volume from the open first end toward the second end, and the wall includes a plurality of openings provided through a thickness of the wall for allowing root growth from the container. The container preferably comprises an injection moldable Biodegradable Plastic In another aspect, the present invention is directed to method of transplanting a plant into soil, wherein the method comprises a step of selecting a plant as such plant is provided within a horticulture container wherein the container comprises a wall defining an enclosure that is open at a first end and closed at a second end by a bottom portion, the enclosure defining a containment volume within which soil and plant roots are contained, wherein the enclosure is tapered so as to decrease the containment volume from the open first end toward the second end, and the wall includes a plurality of openings provided through a thickness of the wall for allowing root growth from the container, and further wherein the container comprises an injection moldable Biodegradable Plastic; and a step of placing the container within soil with the openings of the container below a soil surface to permit root growth from within the containment volume into the soil. As such, the container can degrade by microorganisms within the soil and provide nutrients to the plant roots.

In another aspect the present invention is directed to a system for growing a plant, wherein the system comprises a horticulture container that comprises a wall defining an enclosure that is open at a first end and closed at a second end by a bottom portion, the enclosure defining a containment volume within which soil and plant roots can be contained, wherein the enclosure is tapered so as to decrease the containment volume from the open first end toward the second end, and further wherein the container comprises an injection moldable Biodegradable Plastic; and a planter that is sized and shaped to receive the horticulture container. By such a system, plant roots and soil can be provided within the containment volume of the horticulture container and the horticulture container can be positioned within the planter so that the horticulture container can degrade by microorganisms within the soil and provide nutrients to the plant roots.

DETAILED DESCRIPTION

Figure 1:
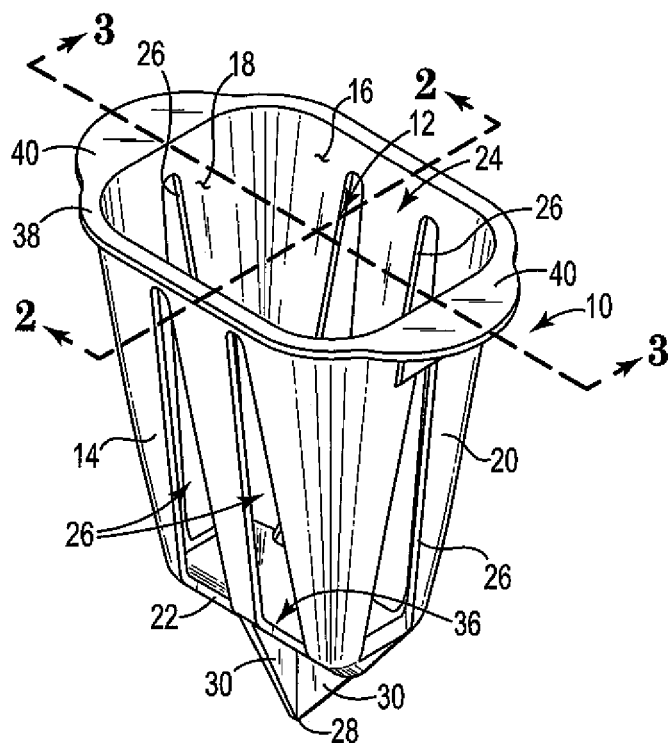
FIG. 1 is a perspective view of a first embodiment of a horticultural container in accordance with the present invention, the container having a substantially rectangular top opening and having a generally tapered design from top to bottom with slotted front, rear, and side walls.

The present invention relates to the containment of plants and seedlings as such plants or seedlings are grown, transported, displayed and planted. Preferably, containers of the present invention are comprised of biodegradable materials that have the advantage of being formed into containers with various features, such as by an injection molding process, but that can be buried within the soil along with a plant's roots. Such containers allow for plant or seedling transplanting without having to separate the container from the plant's root system. More preferably, biodegradable plastics utilized in accordance with the present invention have properties such that the plastic can be injection molded (forcing molten plastic into a prefabricated mold by pressure) and yet provide a stable structural container that will last in accordance with predetermined set needs, which needs may include environmental aspects, timing aspects and decompositional aspects. By utilizing injection molding, containers can be formed with many advantageous features as described below. Containers of the present invention can be manufactured by other plastic forming techniques than injection molding. Any plastic forming technique can be utilized, such as vacuum forming, thermoforming, molding, cast molding, blow molding, and other well-known molding techniques. An advantage of injection molding is the ability to easily and cheaply create containers with advantageous features for the present invention.

For purposes of the present invention, a "Biodegradable Plastic" is a degradable plastic in which the degradation results from the action of naturally occurring microorganisms such as bacteria, fungi and algae.

For purposes of the present invention, an "Industrially Compostable Plastic" is a plastic that undergoes degradation by biological processes during composting in a municipal or industrial aerobic composting facility to yield $CO_2$, water, inorganic compounds and biomass at a rate consistent with other compostable materials and leaves no visible, distinguishable or toxic residue as set forth in ASTM D6400.

For purposes of the present invention, a "{number} Day Garden Compostable Plastic" is a plastic that undergoes degradation by biological processes to yield $CO_2$, water, inorganic compounds and biomass and leaves no visible, distinguishable or toxic residue within an identified number of days after placement in conventional garden soil at temperatures of from about 65° to 75° F. A "360 Day Garden Compostable Plastic" is a plastic wherein the degradation takes place within 360 days. A "180 Day Garden Compostable Plastic" is a plastic wherein the degradation takes place within 180 days. A "90 Day Garden Compostable Plastic" is a plastic wherein the degradation takes place within 90 days. A "45 Day Garden Compostable Plastic" is a plastic wherein the degradation takes place within 45 days.

In an embodiment, the Biodegradable Plastic is an Industrially Compostable Plastic. In an embodiment, the Biodegradable Plastic is a 360 Day Garden Compostable Plastic. In an embodiment, the Biodegradable Plastic is a 180 Day Garden Compostable Plastic. In an embodiment, the Biodegradable Plastic is a 90 Day Garden Compostable Plastic. In an embodiment, the Biodegradable Plastic is a 45 Day Garden Compostable Plastic. In an embodiment, the Biodegradable Plastic is a 30 Day Garden Compostable Plastic. In an embodiment, the Biodegradable Plastic is a 20 Day Garden Compostable Plastic. In an embodiment, the Biodegradable Plastic is a 15 Day Garden Compostable Plastic.

In a preferred embodiment of the present invention, any of the various embodiments of Biodegradable Plastic described above are formulated as injection moldable Biodegradable Plastic. In an embodiment of the present invention, any of the various embodiments of Biodegradable Plastic described above are formulated as a reaction injection moldable Biodegradable Plastic. In an embodiment of the present invention, any of the various embodiments of Biodegradable Plastic described above are formulated as a thermoforming Biodegradable Plastic. In an embodiment of the present invention, any of the various embodiments of Biodegradable Plastic described above are formulated as a vacuum forming Biodegradable Plastic. In an embodiment of the present invention, any of the various embodiments of Biodegradable Plastic described above are formulated as a blow molding Biodegradable Plastic. In an embodiment of the present invention, any of the various embodiments of Biodegradable Plastic described above are formulated as a cast molding Biodegradable Plastic. In an embodiment of the present invention, any of the various embodiments of Biodegradable Plastic described above are formulated as a rotational molding Biodegradable Plastic. In an embodiment of the present invention, any of the various embodiments of Biodegradable Plastic described above are formulated as a spin casting Biodegradable Plastic. In an embodiment of the present invention, any of the various embodiments of Biodegradable Plastic described above are formulated as a compression moldable Biodegradable Plastic. In an embodiment of the present invention, any of the various embodiments of Biodegradable Plastic described above are formulated as a machinable Biodegradable Plastic.

In an embodiment, the Biodegradable Plastic comprises a polymer selected from the group consisting of polylactic acid polymer, polyhydroxyalkanoate polymer, starch based resin, polyesters, cellulose esters, biobased polyethylene compounds, and mixtures thereof.

In an embodiment, the Biodegradable Plastic comprises polylactic acid polymer. Polylactic acid polymer (or "PLA") is derived from a sugar source such as corn, cellulosic raw materials, agricultural wastes and non-food plants. PLA polymers are described, for example, in U.S. Pat. No. 5,798,436, the disclosure of which is incorporated herein by reference. A PLA is sold under the brand name Ingeo™ by NatureWorks LLC. In an embodiment, the Biodegradable Plastic is a blend of co-polyester and PLA, optionally with additional natural fillers and the like. Such blends are commercially available under the name BIO-FLEX® from FKuR Kunststoff GmbH, Willich, Germany.

In an embodiment, the Biodegradable Plastic comprises polyhydroxyalkanoate polymers (PHAs) such as those sold under the brand Mirel™ resins from Metabolix, Cambridge Mass., and polyhydroxy-butyrate-co-valerate (PHBV) resins from TianAn® Biologic Material Co., Zhejiang, China.

In an embodiment, the Biodegradable Plastic comprises cellulosic resins sold under the brand BIOGRADE® injection moldable cellulosic from FKuR Kunststoff GmbH, Willich, Germany.

In an embodiment, the Biodegradable Plastic comprises co-polymerizable components, such as soy proteins. Suitable soy proteins include soy protein concentrates (SPCs) and soy protein isolates (SPCs), which are commercially available from Solae Company, St. Louis, Mo.

In an embodiment, the Biodegradable Plastic comprises an organic filler material, such as polyethylene glycol, glycerol, zein, corn starch, distillers dry grains with solubles, and mixtures thereof. In an embodiment, the Biodegradable Plastic comprises an organic filler material that is distillers dry grains with solubles ("DDGS"), such as a DDGS sold under the brand BioRes™ by Laurel Biocomposite LLC.

In an embodiment, the Biodegradable Plastic comprises an inorganic filler material, such as nanoclays.

It will be appreciated that the skilled artisan is capable of adjusting the length of time required for biodegradation of containers of the present invention by selection of the dimensions of the container (e.g. including relative thickness of zones or portions of the container), as further discussed below, and/or incorporating varying amounts or organic filler, reactive species and enzymes that hasten the biodegradation of the material.

In an embodiment, the Biodegradable Plastic is further augmented with plant-beneficial nutrients. In an embodiment, fertilizing components such as nitrogen (N), phosphorus (P), and potassium (K) may be added to the Biodegradable Plastic, and will be released to the seedling and later in the soil. In addition, as the Biodegradable Plastic becomes soluble after planting, they release part of the fertilizing components or micronutrients that are part of their structure.

In an embodiment, the Biodegradable Plastic is further augmented with micronutrients to promote plant grown of plants to be provided in the present horticulture containers. Examples of such micronutrients include Calcium (Ca), Cobalt (Co), Copper (Cu), Zinc (Zn), Magnesium (Mg), Iron (Fe), Sulfur (S), Boron (B), Sodium (Na), Manganese (Mn), and Molybdenum (Mo). Examples of amounts of such micronutrients to be incorporated include 0.001 to 15% Copper (Cu), 0.001 to 15% Zinc (Zn), 0.001 to 15% Magnesium (MG), 0.001 to 15% Iron (Fe), 0.001 to 15% Sulfur (S), 0.001 to 10% Boron (B), 0.001 to 10% Sodium (Na), 0.001 to 10% Manganese (Mn), 0.001 to 5% Molybdenum (Mo), and 0.001 to 5% Cobalt (Co). In an embodiment, micronutrients are added in the proportion of up to 5% for vegetable seedlings, up to 10% for fruit tree seedlings, and up to 15% for reforestation seedlings.

In an embodiment, the nutrients and/or micronutrients are distributed through the Biodegradable Plastic such that the Biodegradable Plastic has a visually homogeneous appearance. In an embodiment, the nutrients and micronutrients are distributed through the Biodegradable Plastic such that separate regions of nutrient and/or micronutrient components are visually identifiable in the Biodegradable Plastic.

Referring to FIG. 1, a specific embodiment of a horticultural container 10 of the present invention is shown that preferably comprises Biodegradable Plastic, as described above. More preferably, the container 10 is an injection moldable Biodegradable Plastic.

The illustrated container 10 includes structure defining a containment volume 12 within which potting soil (not shown), such as comprising a germination mix of soil and plant nutrients, can be contained and within which one or more plant seeds can be planted or a plant seedling or otherwise can be transplanted. In this embodiment, a front wall portion 14, a rear wall portion 16, first side portion 18 and second side portion 20 together define the containment volume, which volume is further closed at one end by a bottom portion 22. An opening 24 provides access to the containment volume 12 for soil, seed, and/or plant access. This illustrated embodiment creates a substantially rectangular opening 24 with a similarly shaped containment volume 12, which containment volume 12 is also preferably tapered from the opening 24 toward the bottom 22. This tapered containment volume 12 is a result of creating an injection mold with tapered wall defining volumes for each of the four wall portions so that an integral container 10 is created. The tapered volume is suitable for containment of a plant's root system but is also preferably from an injection molding standpoint in that mold separation and product separation are facilitated.

Preferably, each of the front, rear and first and second side portions 14, 16, 18, and 20, respectively, comprise one or more slots 26. Slots 26 provide multiple functional aspects of the container 10, including allowing of water passage from the container 10, and permitting root system growth that can extend from the containment volume especially after planting.

Also importantly, the slots 26 can be designed and shaped to accommodate biodegradation. Slots 26 create open spaces within the structural design of the container 10, which not only reduce the quantity of material that is to degrade, but also to create additional surface area that is subject to degradation by contact with naturally occurring microorganisms, as discussed above. By utilizing any number of sized and shaped slots, openings or zones of reduced thickness, biodegradation can be effectively predicted and controlled. The slots 26 are illustrative of a preferred design that provides sufficient structural support of the container wall and side portions 14, 16, 18, and 20 from the top opening 24 to the bottom portion 22. The divergence of the illustrated slots 26 from the top opening 24 toward the bottom portion 22 provides for adequate containment while allowing increasingly greater root system growth at a lower portion of the container 10 for deeper root development after transplant. Also, the diverging slot design of slots 26 facilitate injection molding by providing for easier product separation from the injection molds.

It is contemplated that any number of slots, openings, reduced thickness zones, or other surface features can be utilized with variations to configurations provided to any one or more wall portions of a container 10. As above, such features can be utilized in the design of a controlled biodegradable container. With the use of injection moldable Biodegradable Plastic, any features capable of injection molding can be provided to containers of the present invention.

The bottom portion 22 of the container 10, as illustrated in FIGS. 1-7, preferably includes a spike portion 28 that is more preferably made up plural blade portions 30 that extend from the bottom portion 22 and converge at a point. The spike portion as made up of the blade portions 30 provide a container 10 that is designed for easier ground insertion during a transplanting operation. The spike portion 28 also contributes to an overall preferable design with a generally tapering effect from bottom to top that facilitates injection molding of the container 10. The blade portions 30 also facilitate ground penetration.

Figure 2:
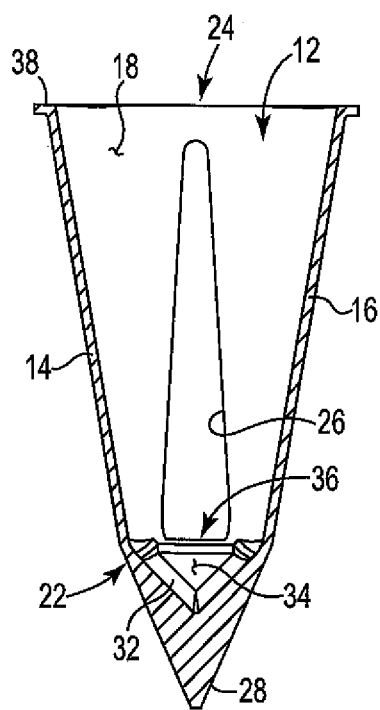
FIG. 2 is a cross-sectional view taken along line 2-2 in FIG. 1 showing an interior containment volume with a bottom reservoir and a spike portion extending from the container bottom.
Figure 3:
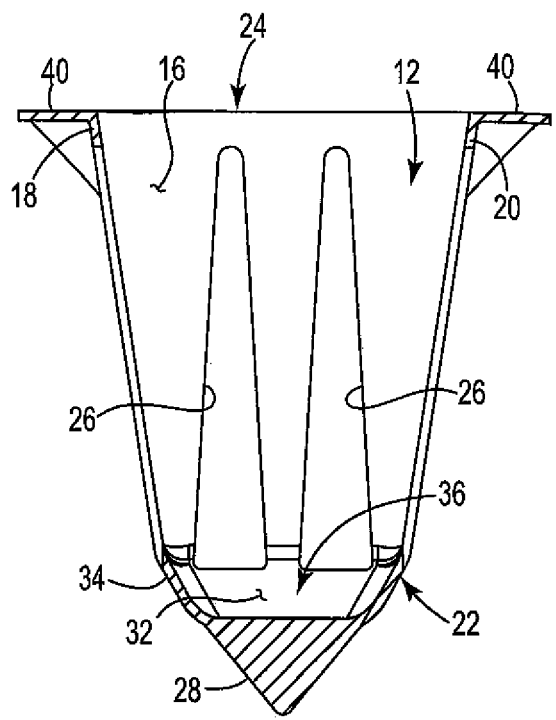
FIG. 3 is a cross-section view taken along line 3-3 of FIG. 1 showing similar aspects of the present invention as also shown in FIG. 2.
Figure 4:
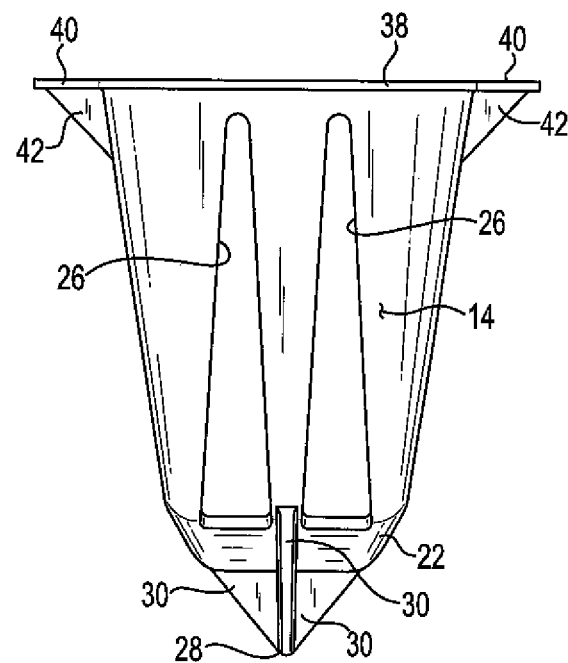
FIG. 4 is front elevational view of the container of FIG. 1.
Figure 5:
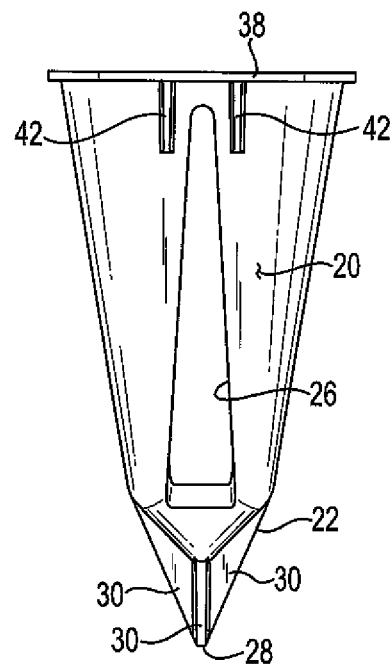
FIG. 5 is a side elevational view of the container of FIG. 1.
Figure 6:
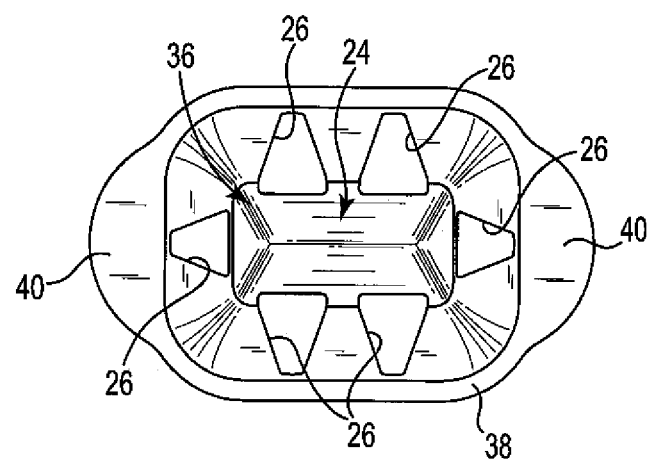
FIG. 6 is a top view of the container of FIG. 1 showing the generally rectangular top opening into the containment volume and with the slots leading toward the bottom reservoir.
Figure 7:
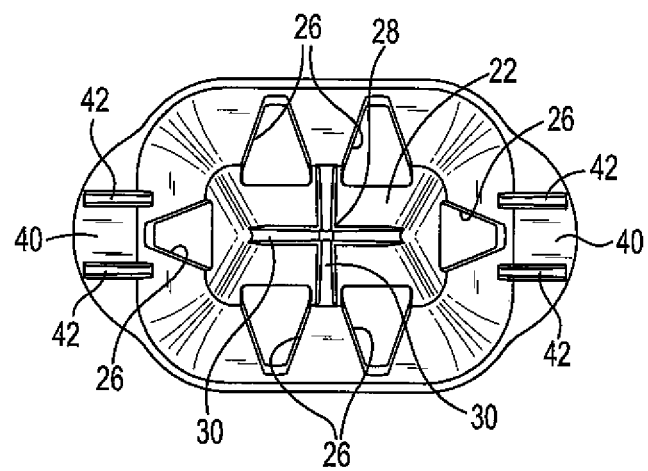
FIG. 7 is a bottom view of the container of FIG. 1 showing the spiked bottom of the container and slots leading toward the bottom portion.
Figure 8:
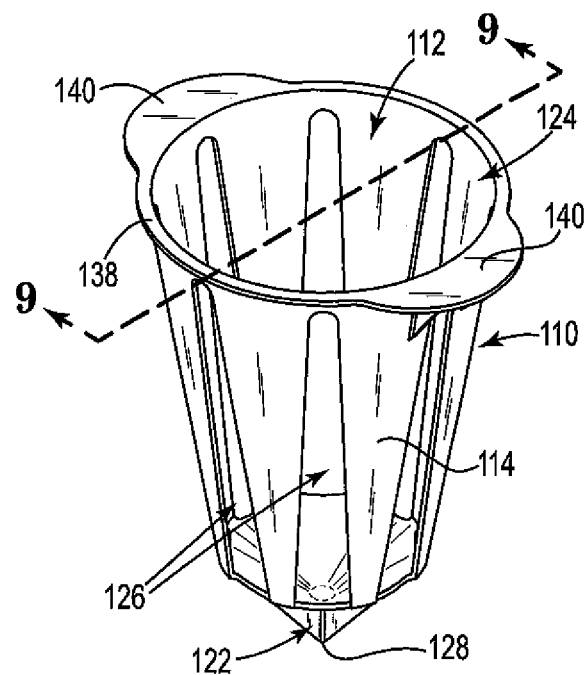
FIG. 8 is a perspective view of a second embodiment of a horticultural container in accordance with the present invention, the container having a substantially circular top opening and having a generally tapered design from top to bottom with a tapered cylindrical side wall.

Interior surface portions 32 and 34 of the bottom portion 22 adjacent to the front/rear and side wall portions, respectively, preferably create a reservoir 36 at the bottom of the containment volume 12, as shown in FIGS. 2 and 3. This reservoir 36 provides a capability to retain a quantity of fluid, e.g. water, when a plant is planted within the container 10 and orientated upright, such as when the container 10 and plant roots are buried in the ground. Although the reservoir 36 would be filled with soil as well, the shape and size can be defined for fluid retention as available to the plant's root system. Advantageously also, the reservoir 36 is preferably created by sloping interior surface portions 32 and 34 so that injection molding is better facilitated.

The volume capacity of the reservoir 36 is preferably at least partially defined by the lowermost edge (as viewed in the Figs.) of one or more of the slots 26. Preferably, one or more of the slots 26 extend at least partially into the bottom portion 22 of the container 10 from one or more of the front/rear or side wall portions. As the volume of liquid exceeds the reservoir volume, the liquid would flow through the slots 26 into the surrounding soil.

The container 10 also preferably includes a top rim flange 38 that surrounds the top opening 24. More preferably, the rim flange 38 further includes push portions 40 that allow a gardener to push the container 10 into the soil as part of a plant transplanting operation. The container 10, itself, as above, is preferably of sufficient structural strength to permit pushing to a desired force level as may be varied depending on soil considerations. Strength can be added to the structure of the push portions 40 by gussets 42 extending from the push portions 40 to the side wall portions 18 and 20.

It is contemplated that other structural features can be added along interior or exterior surface portions along the container front/read, bottom, and side wall portions, 14, 16, 22, 18, and 20, respectively. Such features can include reinforcing elements like ribs, gussets, bosses and the like to create strength features or to create zones of weakness as may also be desired.

Another embodiment in accordance with the present invention is illustrated in FIGS. 8 through 13. Similar components of this embodiment as in the first embodiment are labeled with similar numbers but with a 1 as the hundredth digit. Specifically, a horticultural container 110 of the present invention is shown that also preferably comprises an injection moldable Biodegradable Plastic, as described above.

The illustrated container 110 includes structure defining a containment volume 112 within which potting soil (not shown), can be contained and within which one or more plant seeds can be planted or a plant seedling or otherwise can be transplanted. In this embodiment, a generally circular opening 124 provides access to the containment volume 112 for soil, seed, and/or plant access. A tapered cylindrical side wall 114 defines a substantially truncated conical containment volume 112. The containment volume is further closed at the smaller end by a bottom portion 122. This tapered containment volume 112 is a result of creating an injection mold with a tapered wall defining volume for the tapered cylindrical wall so that an integral container 110 is created. The tapered volume is suitable for containment of a plant's root system but is also preferably from an injection molding standpoint in that mold separation and product separation are facilitated.

Preferably, the tapered cylindrical wall comprises one or more slots 126. More preferably, the slots are arranged at a regular interval about the circumference of the side wall 114, although not necessarily. Slots 126 provide multiple functional aspects of the container 110, including allowing of water passage from the container 110, and permitting root system growth that can extend from the containment volume especially after planting and prior to degradation of the container 110 structure.

As above, the slots 126 can be designed and shaped to accommodate biodegradation. Slots 126 create open spaces within the structural design of the container 110, which not only reduce the quantity of material that is to degrade, but also to create additional surface area that is subject to degradation by contact with naturally occurring microorganisms, as discussed above. By utilizing any number of sized and shaped slots, openings or zones of reduced thickness, biodegradation can be effectively predicted and controlled. The slots 126 are illustrative of a preferred design that provides sufficient structural support of the container side wall 114 from the top opening 124 to the bottom portion 122. The divergence of the illustrated slots 126 from the top opening 124 toward the bottom portion 122 provides for adequate containment while allowing increasingly greater root system growth at a lower portion of the container 110 for deeper root development after transplant. Also, the diverging slot design of slots 126 facilitate injection molding by providing for easier product separation from the injection molds.

It is contemplated that any number of slots, openings, reduced thickness zones, or other surface features can be utilized with variations to configurations provided to any one or more wall portions of a container 110. As above, such features can be utilized in the design of a controlled biodegradable container. With the use of injection moldable Biodegradable Plastic, any features capable of injection molding can be provided to containers of the present invention.

The bottom portion 122 of the container 110, as illustrated in FIGS. 8-13, preferably includes a spike portion 128 that is more preferably made up plural blade portions 130 that extend from the bottom portion 122 and converge at a point. The spike portion 128, as made up of the blade portions 130, provide a container 110 that is designed for easier ground insertion during a transplanting operation. The spike portion 128 also contributes to an overall preferable design with a generally tapering effect from bottom to top that facilitates injection molding of the container 110. The blade portions 130 also facilitate ground penetration.

Figure 9:
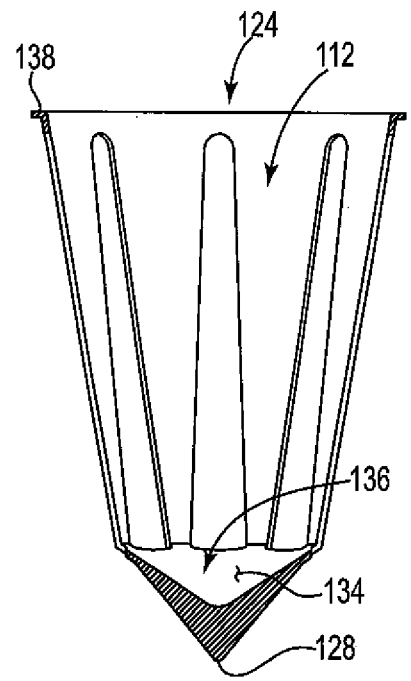
FIG. 9 is a cross-sectional view taken along line 9-9 in FIG. 8 showing an interior containment volume with a bottom reservoir and a spike portion extending from the container bottom.
Figure 10:
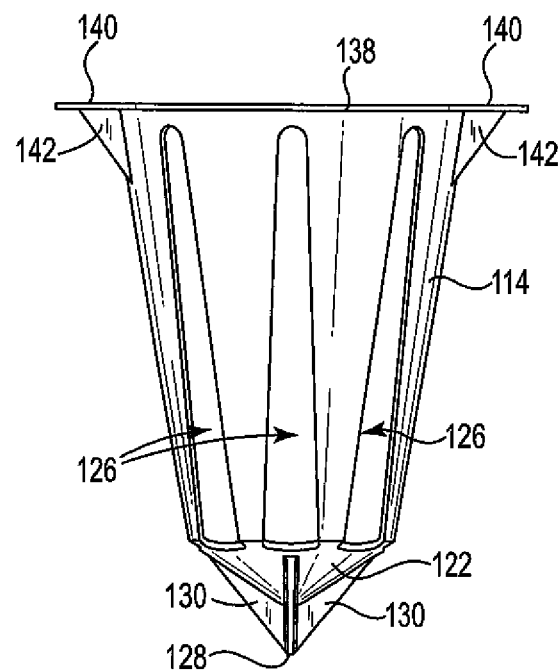
FIG. 10 is front elevational view of the container of FIG. 8.
Figure 11:
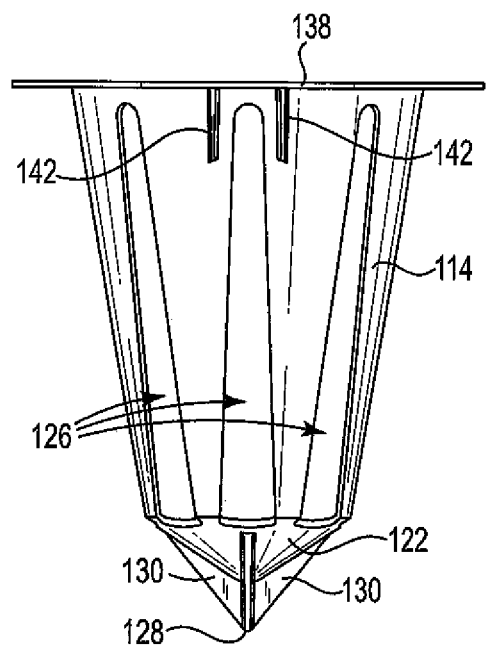
FIG. 11 is a side elevational view of the container of FIG. 8.
Figure 12:
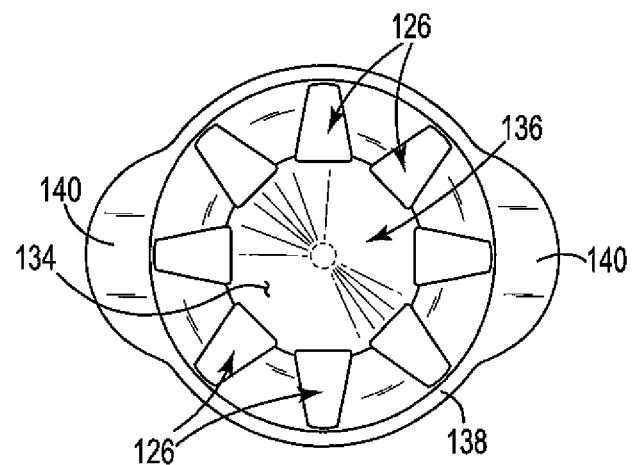
FIG. 12 is a top view of the container of FIG. 1 showing the generally circular top opening into the containment volume and with the slots leading toward the bottom reservoir.
Figure 13:
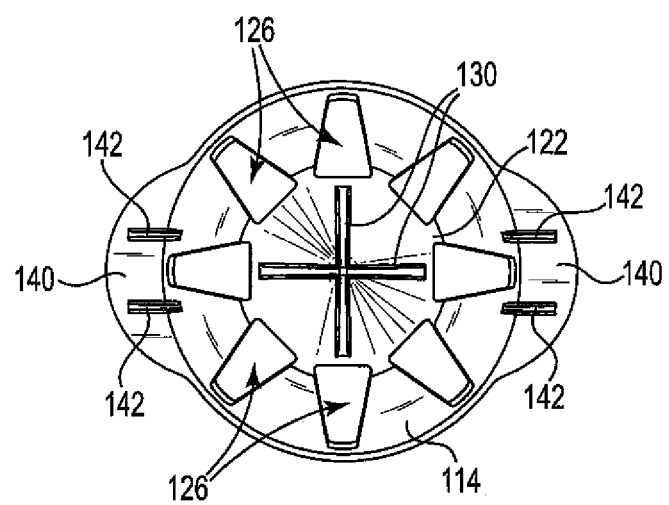
FIG. 13 is a bottom view of the container of FIG. 1 showing the spiked bottom of the container and slots leading toward the bottom portion.
Figure 14:
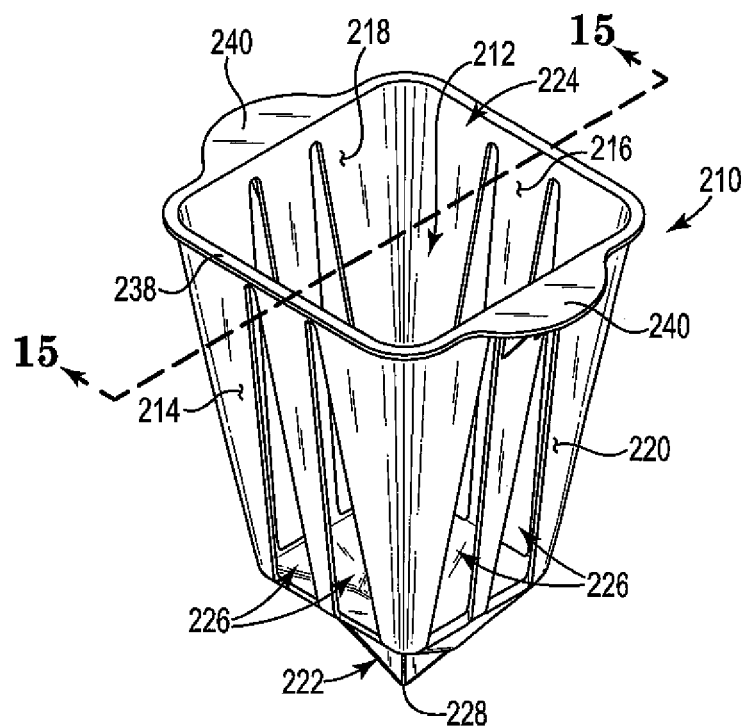
FIG. 14 is a perspective view of a first embodiment of a horticultural container in accordance with the present invention, the container having a substantially square top opening and having a generally tapered design from top to bottom with slotted front, rear, and side walls.

An interior surface portion 134 of the bottom portion 122 adjacent to the side wall 114 preferably creates a reservoir 136 at the bottom of the containment volume 112, as shown in FIG. 9. This reservoir 136 provides a capability to retain a quantity of fluid, e.g. water, when a plant is planted within the container 110 and orientated upright, such as when the container 110 and plant roots are buried in the ground. Although the reservoir 136 would be filled with soil as well, the shape and size can be defined for fluid retention as available to the plant's root system. Advantageously also, the reservoir 136 is preferably created by sloping the interior surface portion 134 so that injection molding is better facilitated.

The volume capacity of the reservoir 136 is preferably at least partially defined by the lowermost edge (as viewed in the Figs.) of one or more of the slots 126. Preferably, one or more of the slots 126 extend at least partially into the bottom portion 122 of the container 110 from the side wall 114. As the volume of liquid exceeds the reservoir volume, the liquid would flow through the slots 126 into the surrounding soil.

The container 110 also preferably includes a top rim flange 138 that surrounds the top opening 124. More preferably, the rim flange 138 further includes push portions 140 that allow a gardener to push the container 110 into the soil as part of a plant transplanting operation. The container 110, itself, as above, is preferably of sufficient structural strength to permit pushing to a desired force level as may be varied depending on soil considerations. Strength can be added to the structure of the push portions 140 by gussets 142 extending from the push portions 140 to the side wall 114.

It is contemplated that other structural features can be added along interior or exterior surface portions along the container side wall 114. Such features can include reinforcing elements like ribs, gussets, bosses and the like to create strength features or to create zones of weakness as may also be desired.

Referring to FIGS. 14 through 19, yet another specific embodiment of a horticultural container 210 of the present invention is shown that preferably comprises an injection moldable Biodegradable Plastic, as described above. Similar components of this embodiment as in the above embodiments are labeled with similar numbers but with a 2 as the hundredth digit.

The illustrated container 210 includes structure defining a containment volume 212 within which potting soil (not shown) can be contained and within which one or more plant seeds can be planted or a plant seedling or otherwise can be transplanted. In this embodiment, a front wall portion 214, a rear wall portion 216, first side portion 218 and second side portion 220 together define the containment volume, which volume is further closed at one end by a bottom portion 222. An opening 224 provides access to the containment volume 212 for soil, seed, and/or plant access. This illustrated embodiment creates a substantially square opening 224 with a similarly shaped containment volume 212, which containment volume 212 is also preferably tapered from the opening 224 toward the bottom 222. This tapered containment volume 212 is preferably a result of creating an injection mold with tapered wall defining volumes for each of the four wall portions so that an integral container 210 is created. The tapered volume is suitable for containment of a plant's root system but is also preferably from an injection molding standpoint in that mold separation and product separation are facilitated.

Preferably, each of the front, rear and first and second side portions 214, 216, 218, and 220, respectively, comprise one or more slots 226. Slots 226 provide multiple functional aspects of the container 210, including allowing of water passage from the container 210, and permitting root system growth that can extend from the containment volume especially after planting.

As above, the slots 226 can be designed and shaped to accommodate biodegradation. Slots 226 create open spaces within the structural design of the container 210, which not only reduce the quantity of material that is to degrade, but also to create additional surface area that is subject to degradation by contact with naturally occurring microorganisms, as discussed above. By utilizing any number of sized and shaped slots, openings or zones of reduced thickness, biodegradation can be effectively predicted and controlled.

The slots 226 are illustrative of a preferred design that provides sufficient structural support of the container wall and side portions 214, 216, 218, and 220 from the top opening 224 to the bottom portion 222. The divergence of the illustrated slots 226 from the top opening 224 toward the bottom portion 222 provides for adequate containment while allowing increasingly greater root system growth at a lower portion of the container 210 for deeper root development after transplant. Also, the diverging slot design of slots 226 facilitate injection molding by providing for easier product separation from the injection molds.

It is contemplated that any number of slots, openings, reduced thickness zones, or other surface features can be utilized with variations to configurations provided to any one or more wall portions of a container 210. As above, such features can be utilized in the design of a controlled biodegradable container. With the use of injection moldable Biodegradable Plastic, any features capable of injection molding can be provided to containers of the present invention.

The bottom portion 222 of the container 210, as illustrated in FIGS. 14-19, preferably includes a spike portion 228 that is more preferably made up plural blade portions 230 that extend from the bottom portion 222 and converge at a point. The spike portion as made up of the blade portions 230 provide a container 210 that is designed for easier ground insertion during a transplanting operation. The spike portion 228 also contributes to an overall preferable design with a generally tapering effect from bottom to top that facilitates injection molding of the container 210. The blade portions 230 also facilitate ground penetration.

Figure 15:
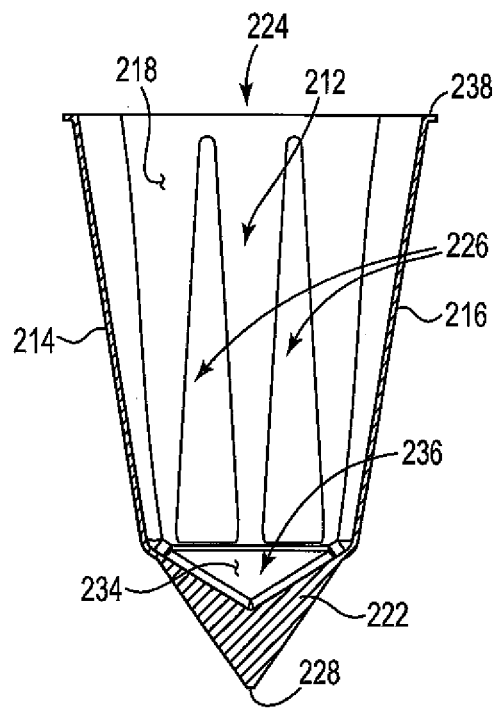
FIG. 15 is a cross-sectional view taken along line 15-15 in FIG. 14 showing an interior containment volume with a bottom reservoir and a spike portion extending from the container bottom.
Figure 16:
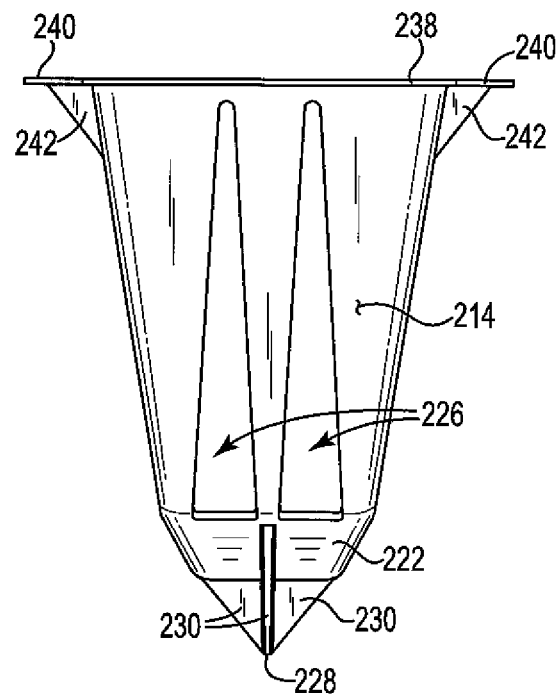
FIG. 16 is front elevational view of the container of FIG. 14.
Figure 17:
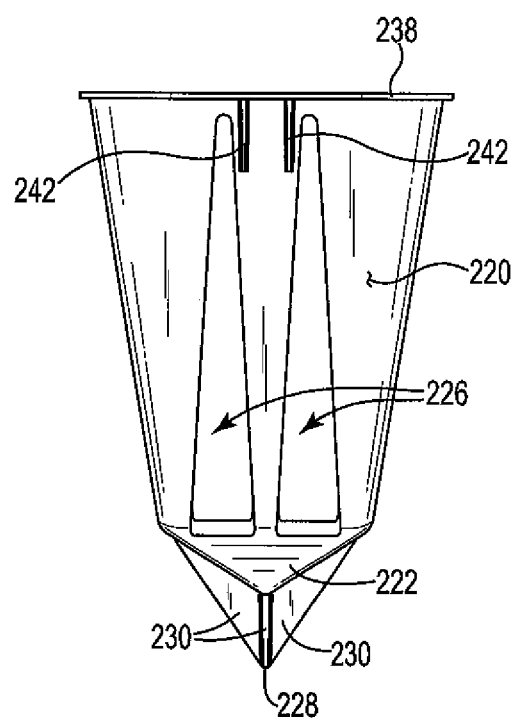
FIG. 17 is a side elevational view of the container of FIG. 14.
Figure 18:
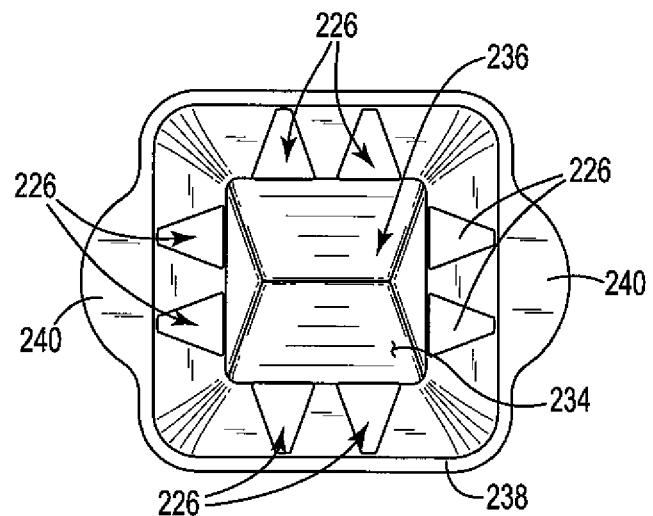
FIG. 18 is a top view of the container of FIG. 14 showing the generally rectangular top opening into the containment volume and with the slots leading toward the bottom reservoir.
Figure 19:
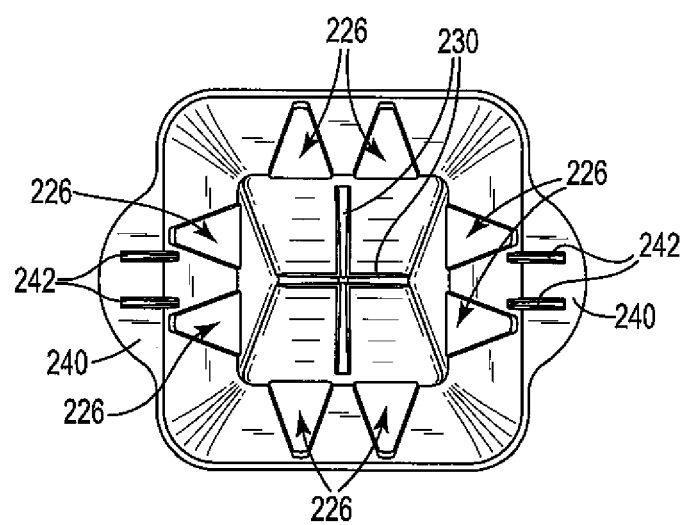
FIG. 19 is a bottom view of the container of FIG. 14 showing the spiked bottom of the container and slots leading toward the bottom portion.

Interior surface portions 234 of the bottom portion 222 adjacent to the front/rear and side wall portions, respectively, preferably create a reservoir 236 at the bottom of the containment volume 212, as shown in FIG. 15. This reservoir 236 provides a capability to retain a quantity of fluid, e.g. water, when a plant is planted within the container 210 and orientated upright, such as when the container 210 and plant roots are buried in the ground. Although the reservoir 236 would be filled with soil as well, the shape and size can be defined for fluid retention as available to the plant's root system. Advantageously also, the reservoir 236 is preferably created by sloping interior surface portions 232 and 234 so that injection molding is better facilitated.

The volume capacity of the reservoir 236 is preferably at least partially defined by the lowermost edge (as viewed in the Figs.) of one or more of the slots 226. Preferably, one or more of the slots 226 extend at least partially into the bottom portion 222 of the container 210 from one or more of the front/rear or side wall portions. As the volume of liquid exceeds the reservoir volume, the liquid would flow through the slots 226 into the surrounding soil.

The container 210 also preferably includes a top rim flange 238 that surrounds the top opening 224. More preferably, the rim flange 238 further includes push portions 240 that allow a gardener to push the container 210 into the soil as part of a plant transplanting operation. The container 210, itself, as above, is preferably of sufficient structural strength to permit pushing to a desired force level as may be varied depending on soil considerations. Strength can be added to the structure of the push portions 240 by gussets 242 extending from the push portions 240 to the side wall portions 218 and 220.

It is contemplated that other structural features can be added along interior or exterior surface portions along the container front/read, bottom, and side wall portions, 214, 216, 218, and 220, respectively. Such features can include reinforcing elements like ribs, gussets, bosses and the like to create strength features or to create zones of weakness as may also be desired.

The above described multiple embodiments of the present invention show various shapes for containers of the present invention having similar aspects of the present invention. The shape of the container can be virtually any shape that creates a containment volume capable of receiving plant roots along with a quantity of soil. Certain shapes may be more advantageous than others for specific uses, such as including aspects of the present invention described in the following. The above-described embodiments show examples of shapes in accordance with the present invention.

Figure 20:
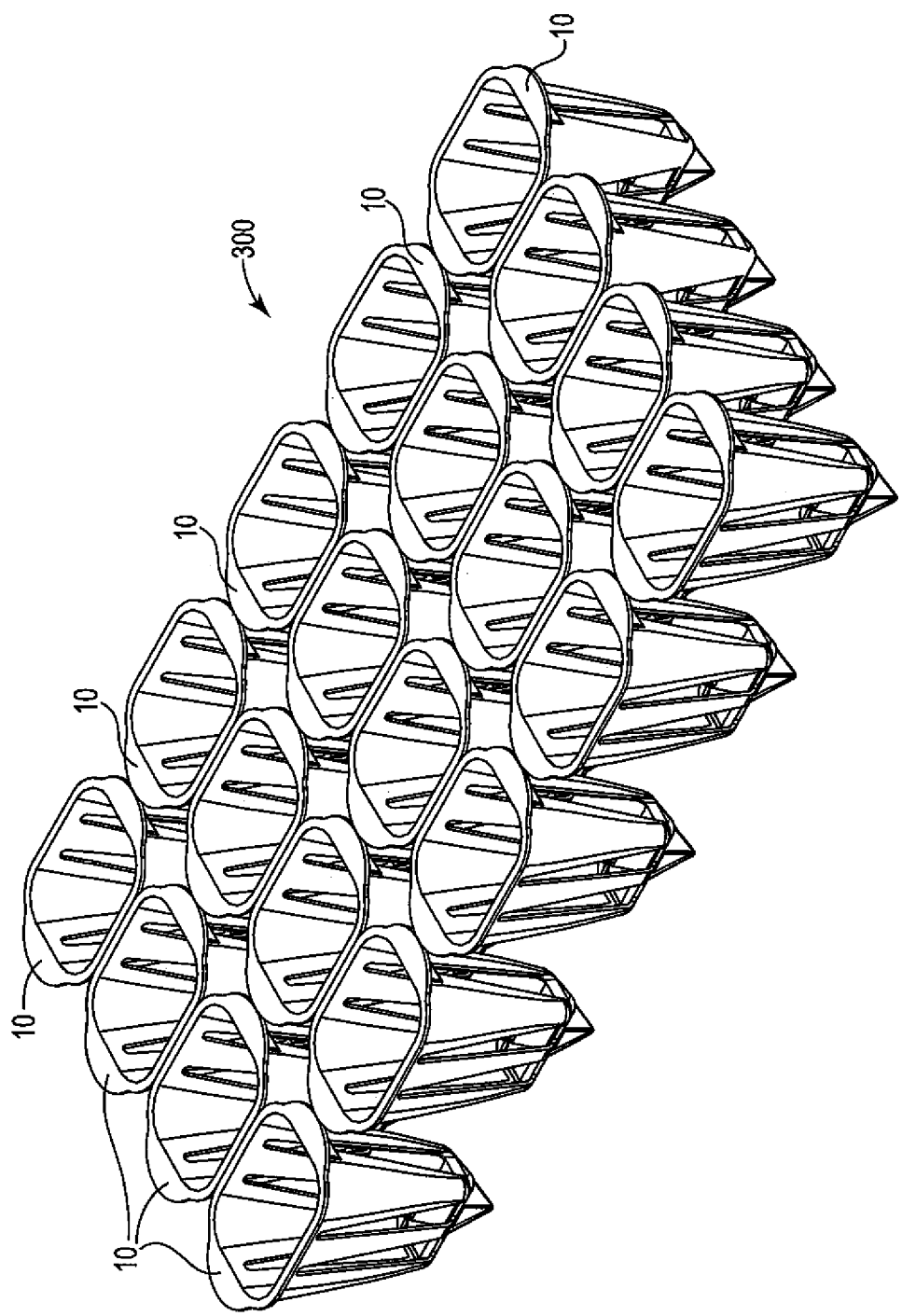
FIG. 20 is a perspective view of an array of containers of FIG. 1, which containers are separably connected to one another along edge portions.

In FIG. 20, another aspect of the present invention is illustrated, wherein an array 300 of horticultural containers 10 is provided. Preferably, the array 300 comprises an arrangement of containers 10 with the containers 10 separably connected with one another along at least two edges. Specifically, in the case of a rectangular array 300, as shown, the corner containers would be connected to two adjacent containers, on one side edge and one end edge. Other outer row containers would be connected on three edges, at one side and both end edges. Internal containers would be connected on all four edges, both side and both end edges. The array 300 can be of any size and include any number of containers, which arrangement may be rectangular or otherwise without limitation so long as at least two containers are separably connected on at least one side edge, e.g. at least two containers separably connected together, for purposes of this embodiment.

Preferably, plural containers 10 are separably connected together along one or more lines of weakening of the plastic material of the containers. That is, the edge connections between adjacent containers 10 are preferably connected along weakened lines. Such a line of weakening can comprise a reduced thickness line, a line of perforations or partial perforations, structural features like ribs or protrusions, or the like. Most preferably, each edge connection between all adjacent containers comprises such a line of weakening so that each container 10 is easily and fully separable from the others.

Figure 21:
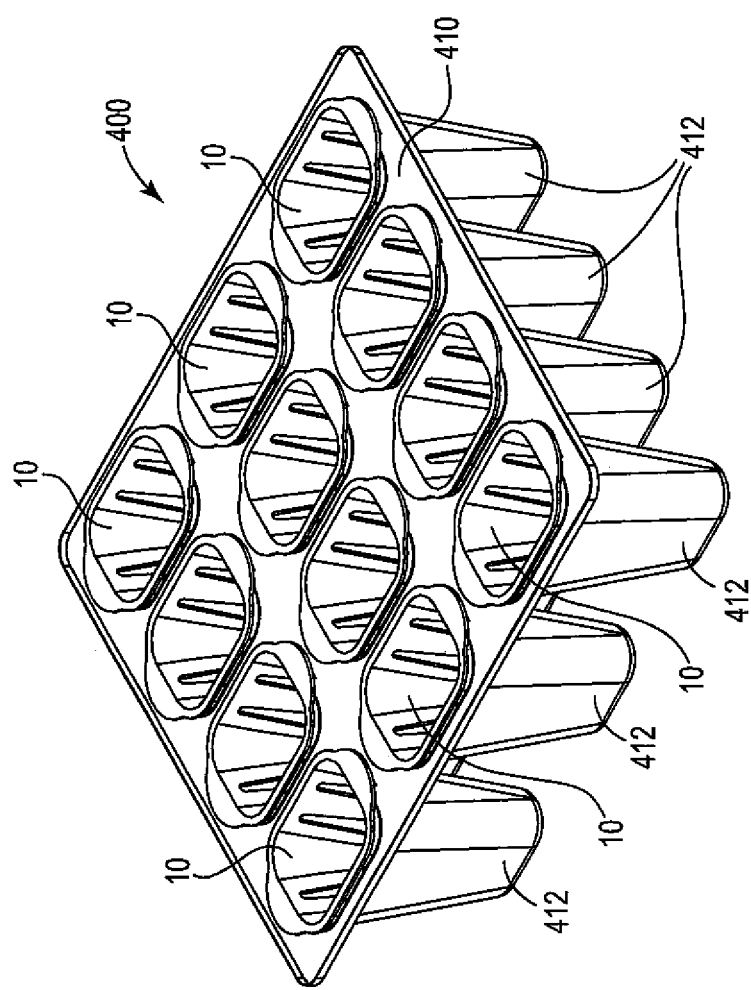
FIG. 21 is a perspective view of an array of containers of FIG. 1 with plural containers provided and supported in position by way of a base tray.

FIG. 21 illustrates an array 400 of containers 10 without the containers 10 having a material connection to one another. In the embodiment, containers 10 are supported in a base tray 410 having an array of receiving cups 412. Preferably, each cup 412 can receive one container 10, although cups 412 can be designed to receive more than one container. It is contemplated that a single cup or depression can hold all of the containers 10 of an array 400 of containers.

Figure 22:
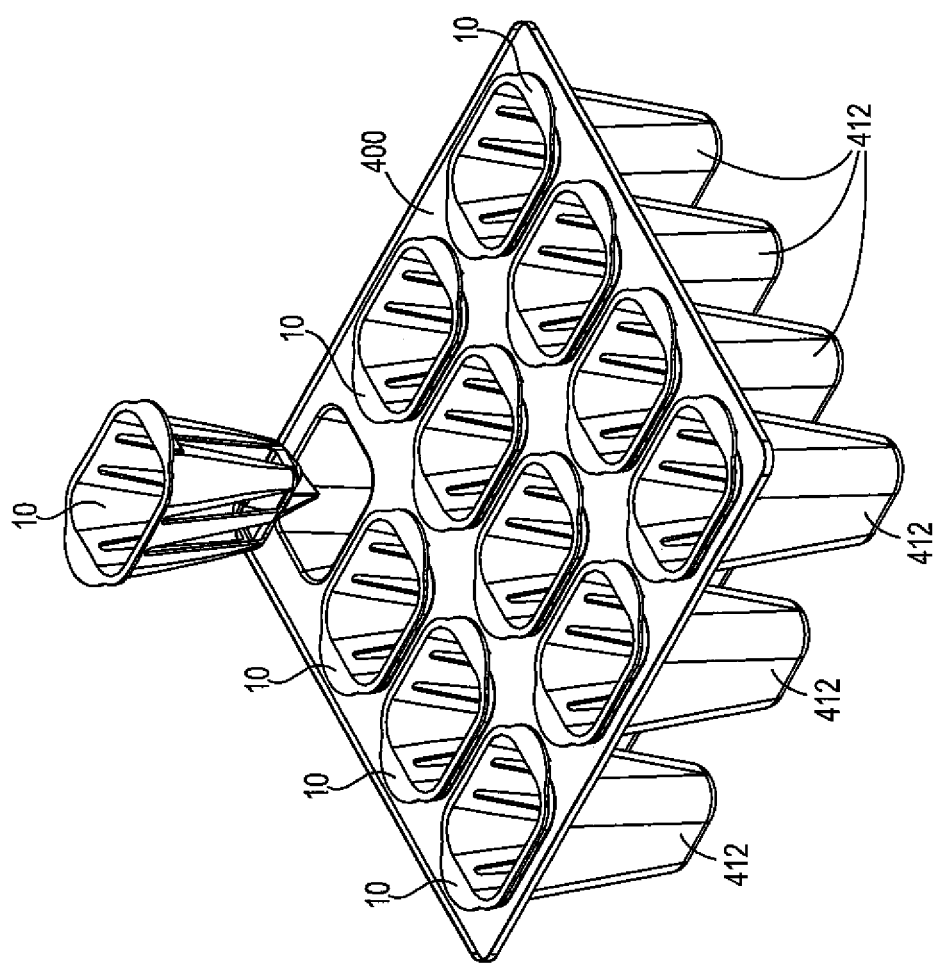
FIG. 22 is a view similar to FIG. 21, but with one container in a separated position from the base tray and the other containers.

As above, the array 400 can be of any size and include any number of cups 412 and/or containers 10, which arrangement may be rectangular or otherwise without limitation. Similar to the array 300 where plural containers 10 are separably connected to one another along edge connections, the containers 10 of the array 400 are separable from one another and positioned or indirectly connected with one another by way of the base tray 410. FIG. 22 shows the separation of one container 10 from the others.

The receiving cups 412 are preferably shaped similarly to the outer shape of the containers 10, as illustrated. However, it contemplated that the cup shape can be any shape that is merely capable of receiving one or more cups. The cup depth need not be sufficient to fully receive the containers. The containers may or may not have a spike portion 30, as discussed above and the cups 412 may or may not have a receiving portion that corresponds with the spike portion 30, whether or not the spike portion is provided. It is also contemplated that the array 400 can accommodate different containers 10, 110, 210, and the like as may be mixed or not by a tray 410 design.

Figure 23:
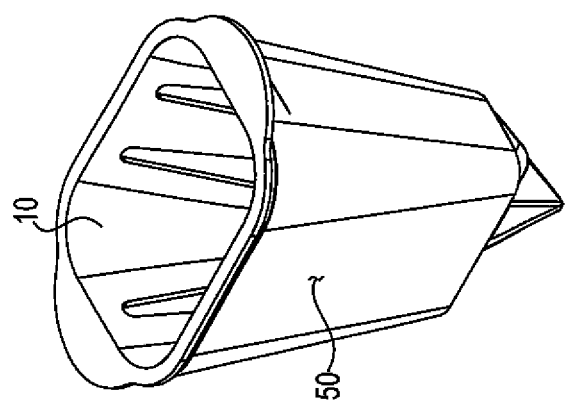
FIG. 23 is a perspective view of the container of FIG. 1 in combination with a liner or sleeve for temporary closing of the container slots.

FIG. 23 illustrates another optional aspect that can be utilized in containers of the present invention. Shown is a container 10, such as illustrated in FIGS. 1-7, that includes slots 26, as described above. In order to better temporarily contain soil and/or plant roots within the container 10, a separable sleeve 50 can be provided. The sleeve 50 can be provided as a label that adheres to the surface of the container to cover one or more slots 26, or can be a non-adherent sleeve, for example of paper or cardboard, or the like. The sleeve 50 can be a layer that is wrapped about at least a portion of the periphery of the container 10 or may be provided in the form of a preformed sleeve that can be slipped over the smaller end of the container 10 into place. Such a preformed sleeve could preferably be tapered in shape to match a taper of the container 10. In any case, the sleeve 50 is separable from the container 10 as desired, such as a step in the process of planting a plant and container 10 in the soil.

Figure 24:
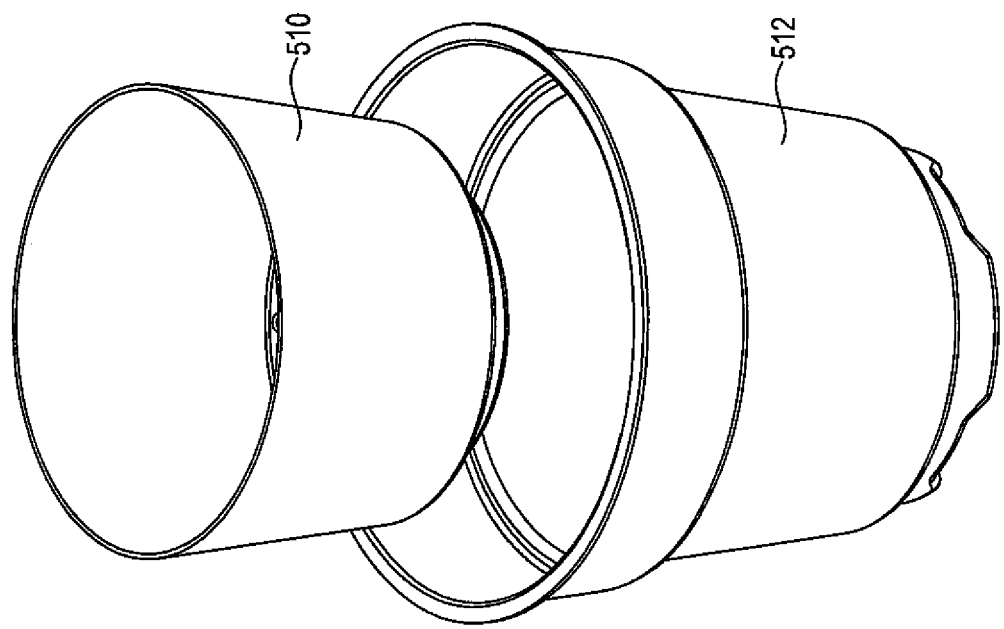
FIG. 24 is an exploded isometric view of a combination of a container of the present invention as utilized as a root system feeding device with a planter.
Figure 25:
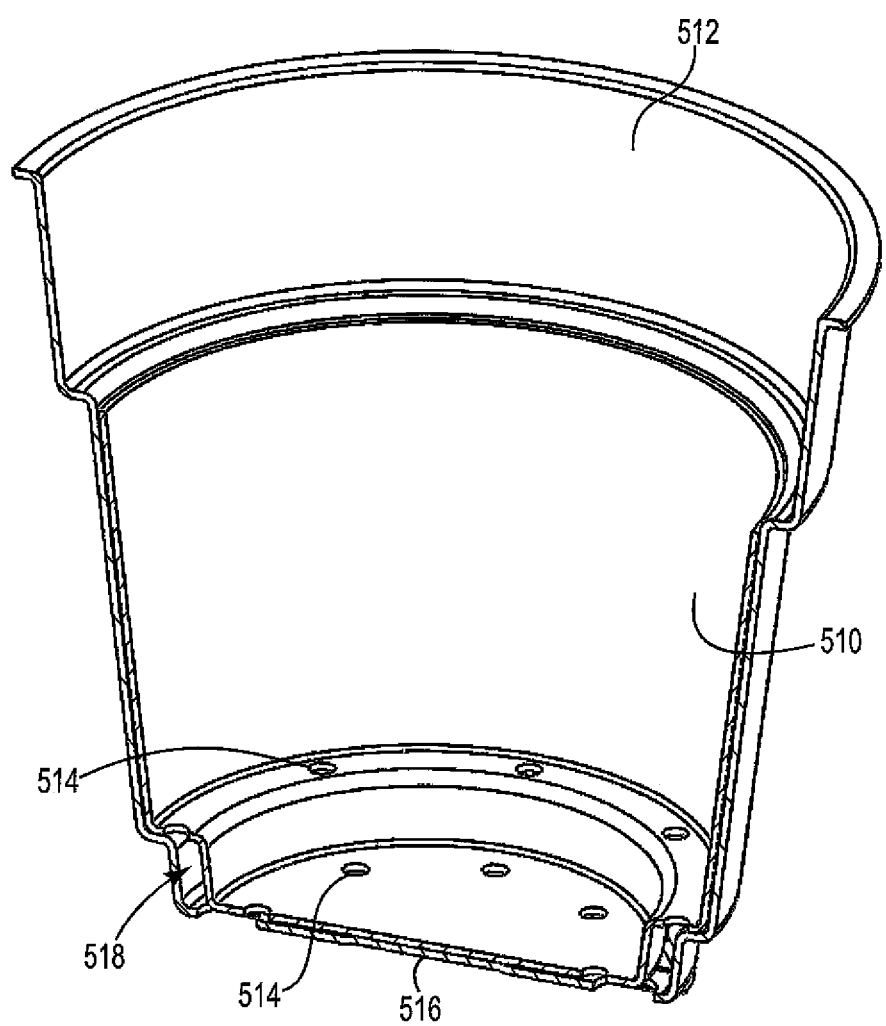
FIG. 25 is a cross-sectional view, in perspective, of the container and planter combination of FIG. 24.

Yet another container 510 of the present invention is illustrated in FIGS. 24 and 25 in combination with a planter 512, which combination is similar to the container 10 and base tray 410 combination described above, but limited to one container 510 and planter 512 combination. In this embodiment, the planter 512 can be sized for longer term plant growth, such as common for houseplants and the like. An advantage of this system is the feeding aspect of the container 510, whereby nutrients are provided to the soil as the container 510 decomposes within soil and as subject to water and microorganisms within the soil It is contemplated that such a container 510 can be provided with a plant or the plant planted into the container 510 and then the plant/container combination can be set into the planter 512 with or without additional soil. After a period of time, preferably based upon the expected decomposition of the container 510, the plant can be transplanted into a new container 510 and replaced in the planter 512, for example. Alternatively, the plant can be transplanted elsewhere and the planter 512 can be used to contain a new plant, such as may have its own new container 510 to provide nutrients to it over an expected length of time. The planter 512 can thus be used over and over, and as such, can be made of a long term more durable material such as well-known plastic planters. The main purpose of a container 510 of this aspect is more for feeding as compared to transplant and planting. The container 510 may or may not extend the entire depth of the planter 512.

As shown in FIG. 25, the container 510 can also include one or more series of holes 514 to permit water drainage from within the container 510 into the planter 512 bottom area 518. As shown, a raised floor portion 516 can facilitate the creation of this bottom area 518. By this construction, a simple replaceable container 510 is created that feeds the plants root system and that can be replaced for continued feeding over a long term plant growth.

A system as shown in FIGS. 24 and 25 can advantageously be provided as a kit, for example, for plant starting purposes. The system can include a planter 512 made of plastic material that will last for any desired length of time. One or more containers 510 can be provided along with the planter 512. A plant, seedling, or seek can be potted in a container 510 and placed into the planter 512 while it grow as nourished from decomposition of the container 510. At a time down the road, such as after the container 510 is decomposed, the plant can be transplanted into the ground or another planter. The planter 512 could thus be utilized over and over with a new container 510 provided with a new starting plant.

The invention claimed is:

1. A horticulture container for being buried in soil along with a transplanted plants and to decompose and provide plant nutrients into the soil as the container decomposes, the container comprising:
   a wall defining an enclosure that is open at a first end and substantially closed at a second end by a bottom that extends at an angle from the wall, the enclosure defining a containment volume within which soil and plant roots can be contained, wherein the enclosure is tapered so as to decrease the containment volume from the open first end toward the second end, the wall includes a plurality of open areas provided through a thickness of the wall for allowing unimpeded root growth from the container, the bottom includes at least one interior surface that is sloped from an edge of the wall so as to define a reservoir within the bottom as an extension of the containment volume, the reservoir providing a fluid retention volume, and each of the plurality of open areas extends over a portion of the wall and over a portion of the interior surface of the bottom to define an upper extent of the fluid retention volume of the reservoir within the bottom.

2. The horticulture container of claim 1, wherein the bottom is also tapered as decreasing in size toward a spike portion that facilitates penetration of the container into soil.

3. The horticulture container of claim 2, wherein the spike portion comprises at least one blade that provides a point.

4. The horticulture container of claim 1, wherein the plural open areas extend most of the way along the wall as slots in a direction from the open first end toward the bottom, and the slots end at a top of the reservoir.

5. The horticulture container of claim 4, wherein the wall comprises plural wall portions defining the open first end as a desired geometric shape.

6. The horticulture container of claim 5, wherein at least one slot of the plurality of slots is provided along each wall portion.

7. The horticulture container of claim 4, wherein the slots are tapered as increasing in width from the open first end of the container toward the bottom.

8. The horticulture container of claim 1, wherein the container further comprises at least one push portion that extends along an upper edge of the wall to facilitate pushing the container into soil.

9. The horticulture container of claim 1, wherein the container comprises a biodegradable plastic and the biodegradable plastic comprises an injection moldable biodegradable plastic.

10. The horticulture container of claim 9, wherein the biodegradable plastic is an industrially compostable plastic.

11. The horticulture container of claim 9, wherein the injection moldable biodegradable plastic is a 360 day garden compostable plastic.

12. The horticulture container of claim 9, wherein the injection moldable biodegradable plastic is a 180 day garden compostable plastic.

13. The horticulture container of claim 9, wherein the injection moldable biodegradable plastic is a 90 day garden compostable plastic.

14. The horticulture container of claim 9, wherein the injection moldable biodegradable plastic is a 45 day garden compostable plastic.

15. The horticulture container of claim 9, wherein the injection moldable Biodegradable Plastic comprises an injection moldable polymer selected from the group consisting of polylactic acid polymer, polyhydroxyalkanoate polymer, starch based resin, cellulose esters, biobased polyethylene compounds, and mixtures thereof.

16. The horticulture container of claim 9, wherein the injection moldable Biodegradable Plastic comprises polylactic acid polymer.

17. The horticulture container of claim 9, wherein the injection moldable Biodegradable Plastic comprises a soy protein.

18. The horticulture container of claim 9, wherein the injection moldable Biodegradable Plastic comprises an organic filler material.

19. The horticulture container of claim 18, wherein the organic filler material is selected from the group consisting of polyethylene glycol, glycerol, zein, corn starch, distillers dry grains with solubles, and mixtures thereof.

20. A method of transplanting a plant into soil comprising:
 selecting a plant as such plant is provided within a horticulture container wherein the container comprises a wall defining an enclosure that is open at a first end and closed at a second end by a bottom that extends at an angle from the wall, the enclosure defining a containment volume within which soil and plant roots are contained, wherein the enclosure is tapered so as to decrease the containment volume from the open first end toward the second end, the wall includes a plurality of open areas provided through a thickness of the wall for allowing unimpeded root growth from the container, the bottom includes at least one interior surface that is sloped from an edge of the wall so as to define a reservoir within the bottom as an extension of the containment volume, the reservoir providing a fluid retention volume, and each of the plurality of open areas extends over a portion of the wall and over a portion of the interior surface of the bottom to define an upper extent of the fluid retention volume of the reservoir within the bottom, and further wherein the container comprises a biodegradable plastic; and
 placing the container within soil with the openings of the container below a soil surface to permit root growth from within the containment volume into the soil, wherein, after transplanting the container can degrade within the soil and provide nutrients to the plant roots.

21. The method of claim 20, wherein the placing step comprise pushing the container into the soil and the pushing step is facilitated by a pointed spike portion extending from the bottom of the container and at least one push portion that extends along an upper edge of the wall.

* * * * *